United States Patent
Herard

(10) Patent No.: US 8,937,774 B2
(45) Date of Patent: Jan. 20, 2015

(54) METHOD FOR MAKING PAIRED LENSES WITH AN OPAQUE BARRIER BETWEEN, AND PRODUCT MADE

(71) Applicant: STMicroelectronics Pte Ltd., Singapore (SG)

(72) Inventor: Laurent Herard, Singapore (SG)

(73) Assignee: STMicroelectronics Pte Ltd., Singapore (SG)

( * ) Notice: Subject to any disclaimer, the term of this patent is extended or adjusted under 35 U.S.C. 154(b) by 137 days.

(21) Appl. No.: 13/657,542

(22) Filed: Oct. 22, 2012

(65) Prior Publication Data

US 2014/0111875 A1    Apr. 24, 2014

(51) Int. Cl.
*G02B 9/00*    (2006.01)

(52) U.S. Cl.
USPC .......................................... 359/754; 359/619

(58) Field of Classification Search
CPC ............................ G02B 27/2214; G02B 3/005
USPC .................................................... 359/754, 619
See application file for complete search history.

(56) References Cited

U.S. PATENT DOCUMENTS

2011/0149143 A1\*    6/2011    Tsujino ......................... 348/374

\* cited by examiner

*Primary Examiner* — James Jones
(74) *Attorney, Agent, or Firm* — Seed IP Law Group PLLC

(57) ABSTRACT

A method comprises depositing an optical filter layer on a glass wafer, then cutting the wafer into dice. The dice are positioned on a carrier and encapsulated in a molding compound to form a reconstituted wafer, and the wafer is background and polished. Lens faces are positioned on opposing surfaces of the glass dice and spacers are positioned on one side of the wafer. The wafer is then cut into lens modules, each having two side-by-side lenses with an opaque molding compound barrier between. The individual modules are attached to devices that require dual lenses, such as, e.g., proximity sensors that use a light source and a light receiver or detector.

16 Claims, 6 Drawing Sheets

US 8,937,774 B2

METHOD FOR MAKING PAIRED LENSES WITH AN OPAQUE BARRIER BETWEEN, AND PRODUCT MADE

BACKGROUND

1. Technical Field Embodiments of the present disclosure are directed to processes for the manufacture of optical lens modules, particularly for use in devices or systems that employ multiple lenses.

2. Description of the Related Art

There are a number of devices that employ two or more lenses in a side-by-side arrangement. Examples of such devices include proximity sensors that use an emitter and a receiver positioned beside each other. The emitter produces a light signal, and when an object approaches the sensor, the signal is reflected by the object and detected by the receiver. Based on characteristics of the detected signal, such as, e.g., intensity, phase, focus, etc., proximity of the object can be determined.

Another example is found in many cell phone cameras, which have a camera lens positioned beside a flash lens.

Devices known as computational cameras employ multiple lenses in an array, each with a different filter to detect respective specific characteristics of a subject.

In each of the examples listed above, it is important that the lenses of the respective device have a specific positional relationship with each other. Generally, the lenses should have lens planes in common, or in some cases, the lens planes of the different lenses should a defined angle between their lens planes. It is therefore preferable to mount the lenses to a single structure so that their relative positions are precisely controlled. However, it is not usually advisable to form the lenses in a single piece of material. Two side-by-side sensor lenses should not, for example be ground from a single piece of glass, or molded into a single piece of optical plastic. Such a configuration can produce cross-talk, in which, for example, the signal generated by the emitter of a proximity sensor is reflected within the lens material and travels laterally, to exit from the other lens and prompt a false reading by the receiver. Thus, devices that employ multiple lenses typically include an opaque barrier between the lenses to prevent cross-talk.

In some cases, the individual lenses can be very small, on the order of, e.g., 1-4 mm in diameter, and positioned very close together, e.g., 500-1500 μm between lenses. Given the size and spacing of such lenses, manufacturing can present a challenge, and can be labor intensive. In one known process, holes are drilled into a small block of opaque material. The holes are filled with an optical plastic, and the block is then placed in a mold to form the faces of the lenses.

BRIEF SUMMARY

According to an embodiment, lens modules for dual-lens devices are manufactured using processes developed for the manufacture of semiconductor devices. A glass wafer is cut into small chips, referred to herein as dice, which are embedded in a layer of molding compound, in a manner similar to a process used to form a "reconstituted wafer" in the semiconductor packaging field. Each of the dice is completely surrounded by the molding compound material, with front and back faces exposed at opposing surfaces of the "wafer." Pairs of the glass dice are embedded in the wafer at a distance that corresponds to the spacing of the intended dual lens devices. Optical plastic is dispensed over front and back faces of each of the embedded dice, and a molding plate forms the optical plastic into lens faces. The wafer is then cut into lens modules that are ready for assembly.

According to another embodiment, a lens module is provided, that includes a pair of lenses, each having a glass body and plastic faces, the pair being substantially embedded in a layer of molding compound.

BRIEF DESCRIPTION OF THE SEVERAL VIEWS OF THE DRAWINGS

FIGS. 1 and 2 are schematic side views of a glass wafer, and FIGS. 3-7 and 9 are side views of a reconstituted wafer, according to the embodiment.

FIG. 8 is a perspective view of the wafer of FIGS. 3-7 and 9

DETAILED DESCRIPTION

FIGS. 1-9 show, at respective stages, a process for manufacturing paired lenses, according to an embodiment. FIGS. 1-7 and 9 are schematic side views. Many of the processes employed in accordance with embodiments disclosed below are similar to processes developed and used in the manufacture and packaging of semiconductor devices. Accordingly, the description of the embodiments will include terms that are typically used to refer to semiconductor manufacturing processes. For the purposes of this disclosure, the meanings of such terms are to be understood as being sufficiently broad as to encompass the structures and process described below.

Figure 1:
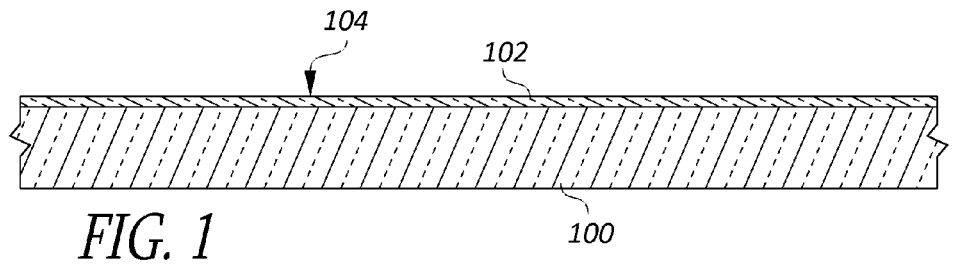
FIGS. 1-9 illustrate, at respective stages, a process for manufacturing paired lenses, according to one embodiment.

FIG. 1 shows a portion of a glass wafer 100. A selectively transparent coating 102 is positioned on the glass wafer 100, and defines a front surface 104 of the wafer. The term front is used here arbitrarily to refer to the face of the wafer 100 that includes the coating 102, as well as the corresponding faces of elements that incorporate portions of the wafer. Faces opposite faces are correspondingly referred to as back faces. These terms are used to simplify the description and are not to be construed as limiting the claims in any way.

The wafer 100 is preferably made of glass, for reasons that will be discussed later, but can be any acceptable material, including any of a number of plastics. Thus, the term glass is to be construed broadly to include any material that meets the optical requirements for a particular use. The selection of the specific material of the wafer 100 will be based on a number of factors, including compatibility with manufacturing processes used, refractive index, coefficient of thermal expansion, optical clarity, transmission spectra, and absorption, cost, etc.

The glass wafer 100 is substantially circular in plan view, and preferably has a diameter that corresponds to a diameter that is commonly used for wafers of semiconductor material, which enables many of the lens manufacturing processes to be performed using equipment designed for the manufacture of semiconductor devices such as integrated circuits and microelectromechanical devices, and for the packaging of such devices. Wafer diameters in common use in that industry include 150 mm, 200 mm, and 300 mm, although many other sizes are known or in development. The thickness of the glass wafer 100 is preferably within a range of about 50 μm-1000 μm in thickness, and more preferably within a range of about 100 μm to 750 μm. While the shape and dimensions described above are preferable, embodiments are not limited to these preferences, but can be defined according to the requirements and conditions of each particular situation.

The selectively transparent coating 102 is formulated to admit selected wavelengths of light and to reject others. For example, according to an embodiment, the coating 102 is a filter that is substantially opaque to ultra-violet light while being transparent to light in the visible spectrum. Depending on the requirements of the particular application, the coating 102 can be selected to admit or reject a range of wavelengths, or to otherwise modify the characteristics of a lens, according to known principles. It should be noted that in many cases, an optical coating comprises a deposit on the surface of a lens that is only a few molecules in thickness, while in other cases a coating may necessarily be much thicker. Thus, the drawings should not be interpreted as being to scale with respect to every possible embodiment or every element depicted.

Typically, devices that employ lenses of the type disclosed here are configured to operate using light at specific ranges of wavelengths, and in many cases, are affected detrimentally by wavelengths of light outside of the specific range. Thus, optical filters are very commonly used. However, the selectively transparent coating 102 is not essential to every embodiment, and can be omitted in cases, for example, where the associated system or device is not adversely affected in the particular circumstances, where the formulation of the material of the glass wafer 100 imparts optical characteristics that obviate the need for additional filtering, and where a filter is provided as a separate element.

Figure 2:
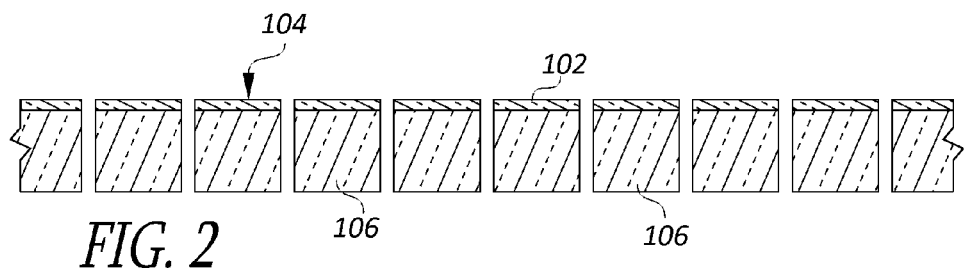

Turning to FIG. 2, following the deposition of the selectively transparent coating 102, the glass wafer 100 is cut into a plurality of pieces, or "dice" 106. The dice 106 are sized according to the dimensions of the intended lens, as will be described in more detail later.

Figure 3:
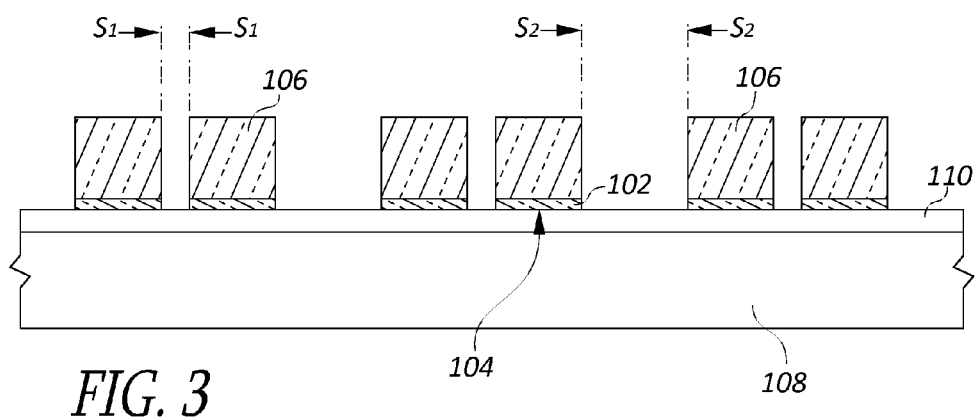

As shown in FIG. 3, each die 106 is placed on a carrier substrate 108. Using "pick-and-place" equipment that is commonly used in semiconductor packaging, robotic machinery picks up each die 106 and positions it front side down on the carrier substrate 108 with a high degree of accuracy. An adhesive layer 110 securely holds the dice 106, and protects the coating 102 on the front sides of the dice from damage. The dice 106 are arranged in pairs on the carrier substrate 108, with a first selected spacing between the dice of each pair, as shown between the arrows $S_1$-$S_1$, and a second selected spacing between adjacent pairs of dice, as shown between the arrows $S_2$-$S_2$. This arrangement is shown in perspective view in FIG. 8.

Figure 4:
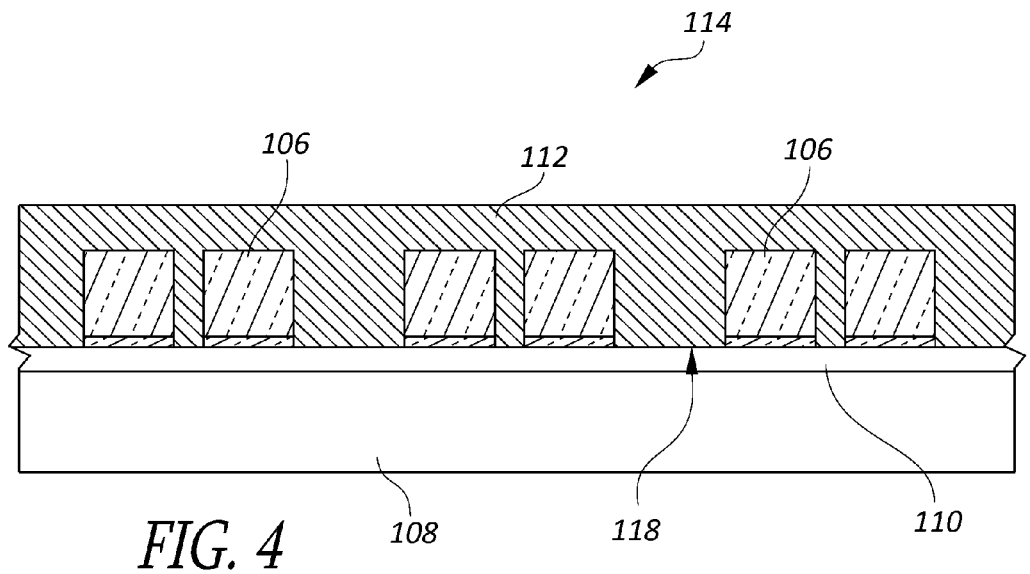

As shown in FIG. 4, a layer of molding compound 112 is deposited over the dice 106 on the carrier substrate. The molding compound is applied as a viscous liquid, and is then cured by heat and direct pressure to form a reconstituted wafer 114. Molding compound is typically formulated with a hard thermosetting plastic resin, and is usually black or dark grey, although other colors are known. For the purposes of the reconstituted wafer 114, the molding compound layer is preferably a dark color such as black or dark grey, in order to be as opaque as possible.

Figure 5:
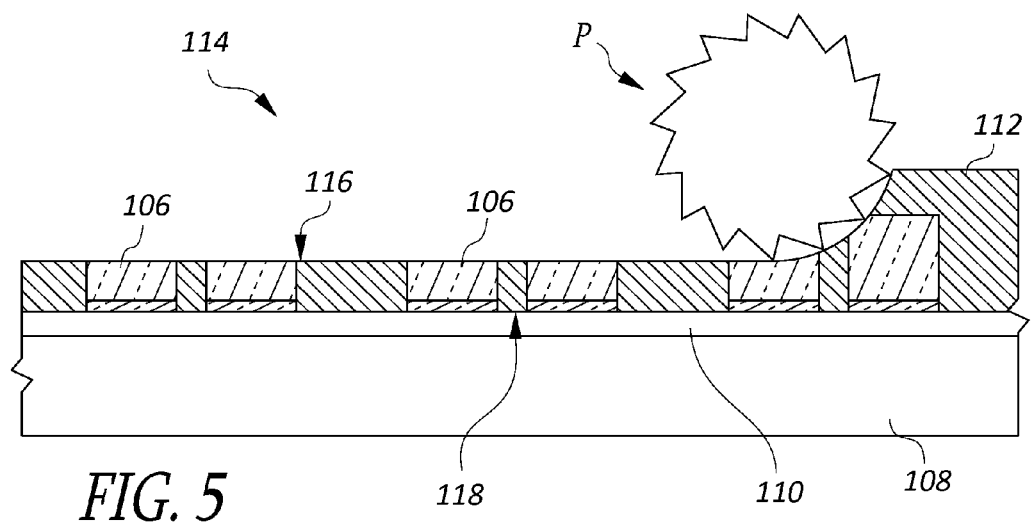

After the molding compound layer 112 is fully cured, a grinding and polishing procedure is performed, as shown in FIG. 5 at P. This process thins and "planarizes" the reconstituted wafer 114, and defines a new back surface 116 of the reconstituted wafer. In the process, the glass dice 106 are also thinned to a selected thickness. According to a preferred embodiment, the dice 106 are reduced to a thickness of between 30 μm and 100 μm. According to other embodiments, the dice 106 are not significantly reduced in thickness, so that they remain at or near their original thickness.

Figure 6:
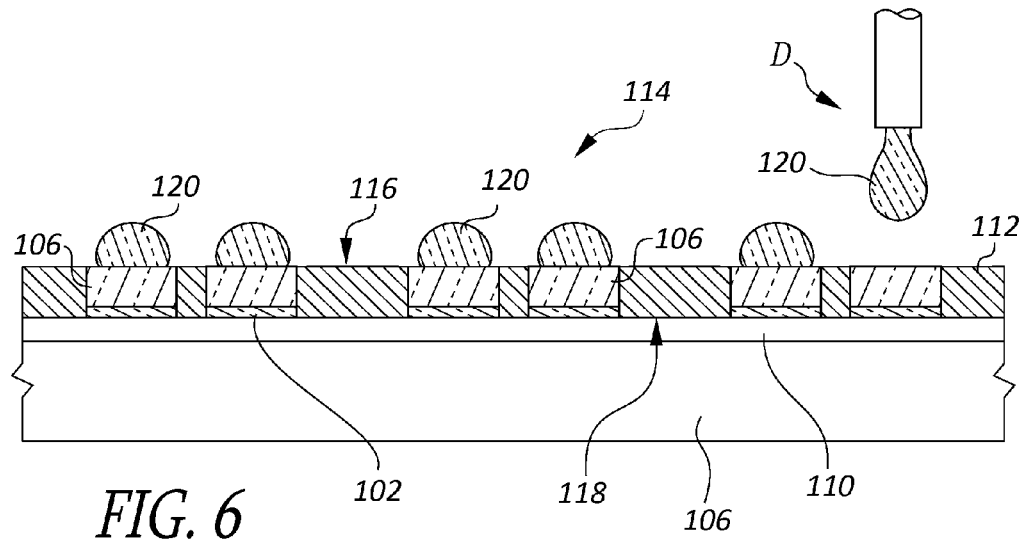
Figure 7:
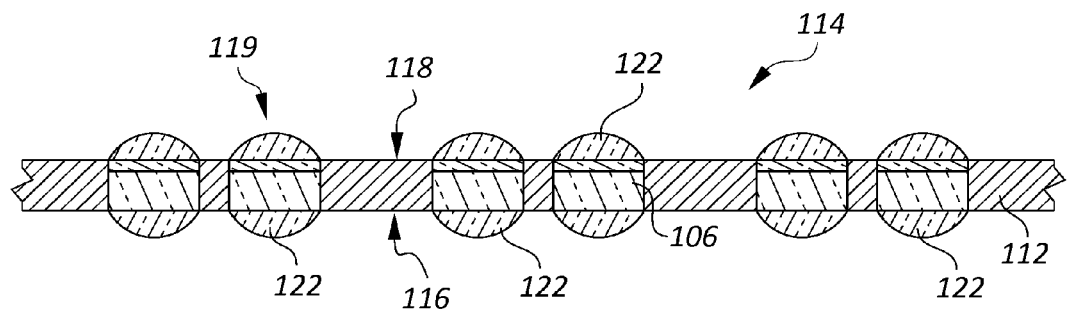

Turning to FIGS. 6 and 7, a clear plastic 120 is deposited on the back face 116 of the reconstituted wafer 114 over each of the dice 106 by a dispenser, shown at D. A mold plate is then pressed down over the face of the reconstituted wafer 114. Cavities in the mold plate impart the desired lens shape to the plastic 120 over each of the dice 106. The plastic 120 is cured, after which the mold plate is removed, leaving lens faces 122 formed by the plastic 120. The reconstituted wafer 114 is then removed from the carrier substrate 108 and turned over. The process is repeated on the front face 118 of the wafer 114 to form lens faces 122 on the front face over the dice 106. By formation of the lens faces 122 on the front and back faces 118, 116 of the reconstituted wafer 114, lenses 119 are formed extending through the reconstituted wafer 114, each comprising a transparent die 106, the selectively transparent coating 102, and a lens face 122 on each side.

While the term plastic is used to describe the lens faces 122, there are many different plastic materials that can be used, according to the specific requirements of the embodiment. The selection of the formulation of the plastic is a design consideration that will depend on a number of factors, including, for example, refractive index, optical transmission characteristics, curing process and rate, refractive index of the glass die, availability, cost, etc. Selection of lens material based on such factors is well understood in the art.

Figure 8:
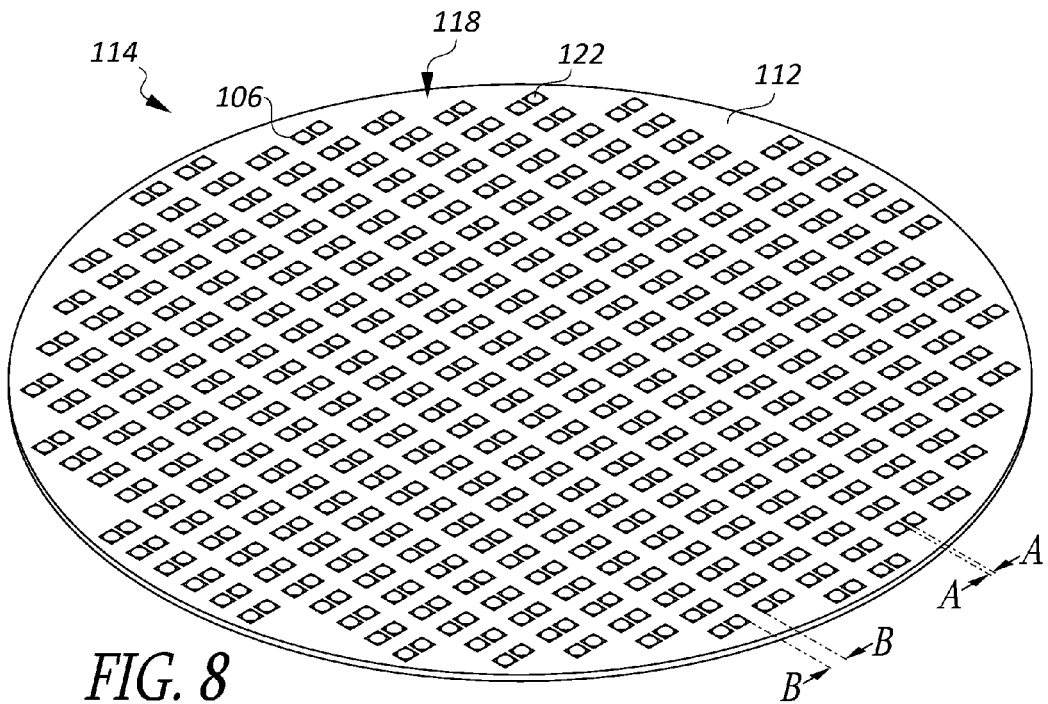

FIG. 8 is a perspective view of the wafer 114 showing elements of the lenses 119, including dice 106 embedded in the molding compound layer 112 and a lens face 122 formed over each of the dice. As shown in FIG. 8, the lenses 119 are arranged in pairs with the first selected space $S_1$ between the lenses of each pair, and the second selected space $S_2$ between adjacent pairs of lenses. In the embodiment of FIG. 8, the second selected space $S_2$ is equal in both horizontal axes.

Figure 9:
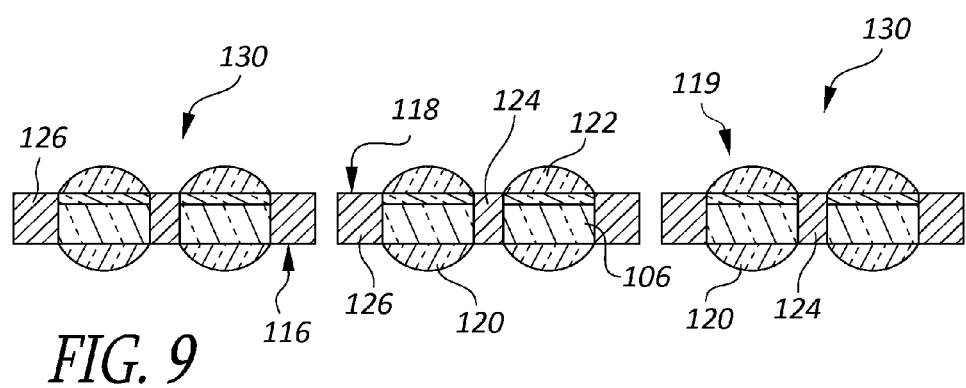

As shown in FIG. 9, after formation of the lenses 122, the reconstituted wafer 114 is cut into individual lens modules 130, each having a pair of lenses 119 embedded in the molding compound layer 112. The material of the molding compound layer 112 extends entirely around each of the lenses 119, with a portion 124 between the lenses and portions 126 around the perimeter.

Selection of elements such as the thickness of the dice 106 after planarization of the reconstituted wafer 114, and the shape and size of the lens faces 122.

Figure 10:
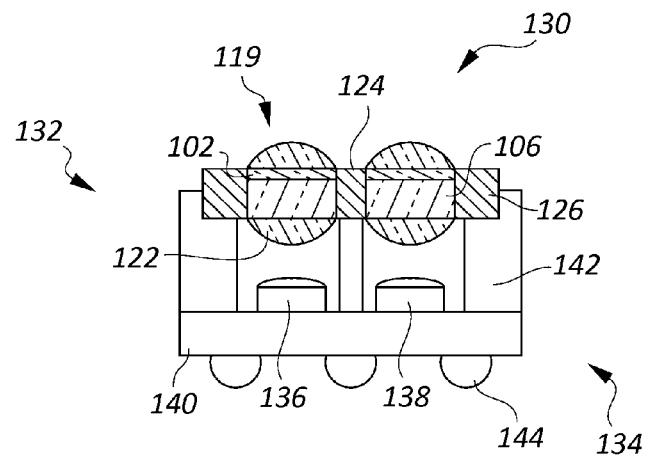
FIG. 10 shows, according to an embodiment, a proximity sensor that includes a dual lens module made according to the process described with reference to FIGS. 1-9.

FIG. 10 shows, according to an embodiment, a proximity sensor 132 that includes a dual lens module 130 like those described with reference to FIGS. 1-9, coupled to a sensor module 134. The sensor module 134 has an emitter 136 and a receiver 138 positioned on a circuit substrate 140, and side walls 142 coupled to the circuit substrate, which extend around and between the lenses 119. Solder balls 144 permit the coupling of the sensor 132 to a circuit board. The sensor module 134 is configured specifically to receive the lens module 130 and vice-versa. Thus, assembly is very simple and inexpensive. The portion 124 of molding compound material positioned between the lenses 119 acts to completely isolate them from each other so that light cannot pass directly from one side to the other. The portions 126 that surround the lenses 119 prevents light leaks from the sides of the sensor 132 from interfering with its operation.

Figure 11:
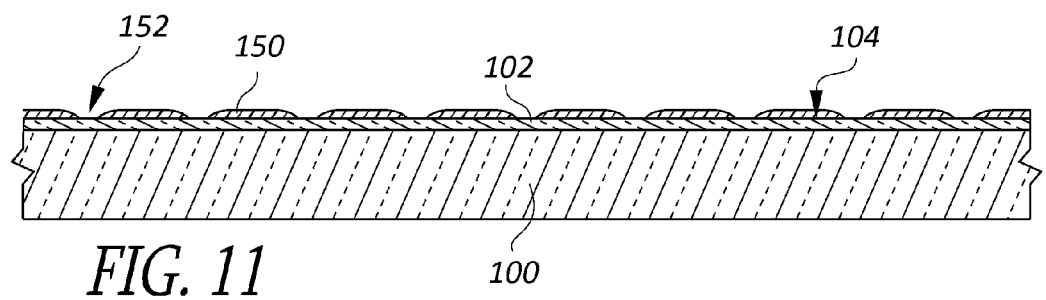
FIGS. 11 and 12 show selected stages in a manufacturing process according to another embodiment.
Figure 12:
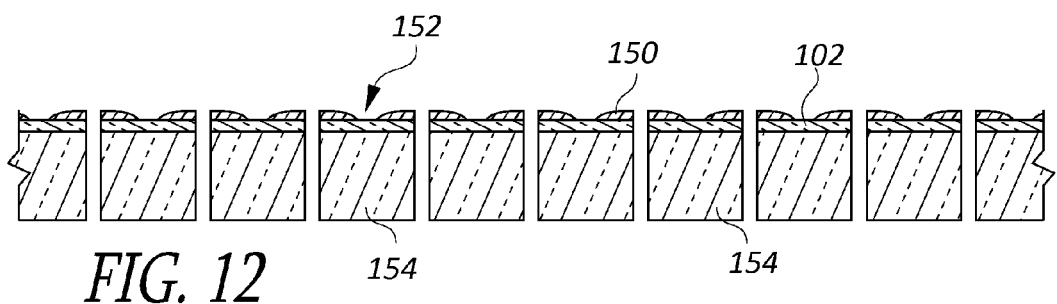

FIGS. 11 and 12 show elements of another embodiment. The embodiment of FIGS. 11 and 12 is substantially similar to that described with reference to FIGS. 1-10, except that, following deposition of the selectively transparent coating 102, as described with reference to FIG. 1, a layer of chrome 150 is deposited on the front surface 104 of the glass wafer 100 over the coating 102. The chrome layer 150 is patterned to form openings 152 that are positioned such that when the glass wafer 100 is cut into dice 154, each die has a layer of chrome 150 with one of the openings 152 substantially in the center of the front face of the die. The dice 154 are then processed to manufacture multiple-lens modules substantially as described previously. The chrome layer 150, although very thin, is substantially opaque, so light passes through the lens only via the small opening, which functions as a lens aperture.

Most photographic cameras are provided with a lens aperture mechanism or structure, which determines the depth of field of the lens. If the aperture is fixed, it may be, for example, a piece of opaque film positioned between the lens and the optical sensor. Where a lens module is intended for use with a fixed-focus camera for general use, it is beneficial for the aperture to be small, relative to the focal length of the camera. This produces a relatively deep depth of field, making the camera practical for use in a variety of conditions. In the case of a very small camera and lens, such as for use in a cell phone, the aperture may be extremely small, which becomes a challenge to assemble. In the embodiment of FIGS. 11 and 12, lens aperture are integral with each of the lenses, which reduces the number of parts, simplifies assembly, and reduces manufacturing costs.

A number of modifications can be made to the disclosed embodiments. For example, where each lens of a multi-lens module will be used for a different purpose, the lenses can be provided with different coatings, different refractive indices, and different sizes. In the case of a computational camera, for example, three or more lenses may have respective different colored filter coatings. In such a case, separate glass wafers can each be coated with respective different filter coatings, then, during the pick-and-place operation described with reference to FIG. 3, the group of glass dice of each lens module can include a die from each of the separate wafers. Alternatively, a single glass wafer can be masked during the coating process so that dice from different parts of the wafer have respectively different filter characteristics.

In the same way, a glass wafer can be made on which all of the dice of the wafer are provided with lens apertures, or the process can be controlled to provide apertures to selected ones of the dice.

As another example, cavities of the mold plate used to form the lenses of a lens module can be made to have different shapes so that the lenses of one module of the reconstituted wafer will have a different focal length from those of another module, or so that the lenses of a given lens module will have different focal lengths. Such an arrangement can be used in a camera cell phone, for example, where one is lens configured to diffuse a flash across a wide area in order to produce reflective highlights and fill, while the other lens is more narrowly focused to capture the photographic image.

Figure 13:
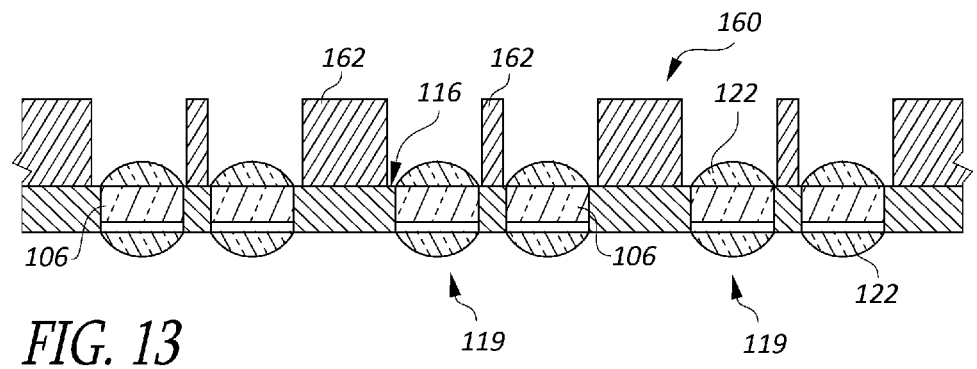
FIGS. 13-15 show selected stages in a manufacturing process according to a further embodiment.
Figure 14:
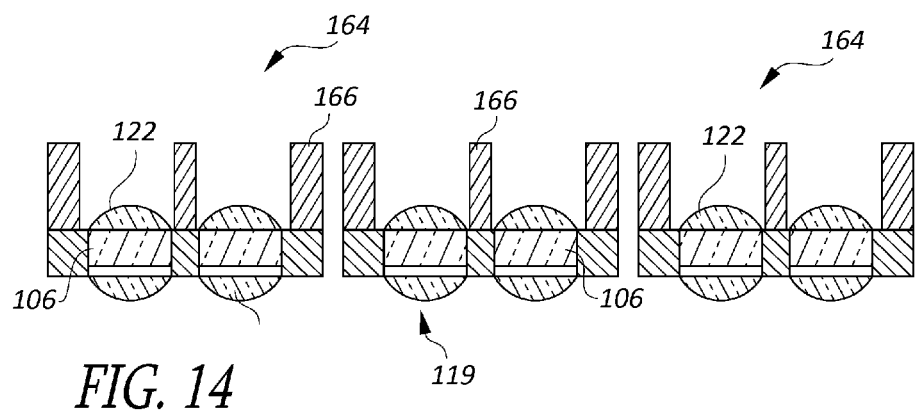
Figure 15:
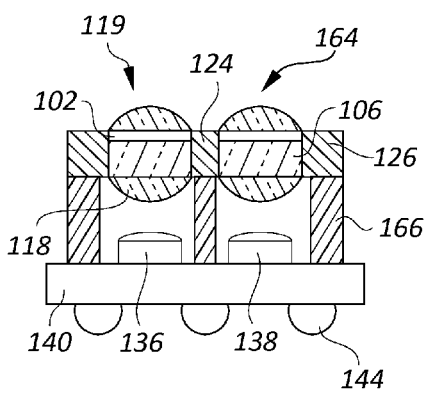

FIGS. 13-15 are schematic side views at respective stages of a manufacturing process according to another embodiment. According to the embodiment of FIGS. 13-15, the process proceeds substantially as described with reference to FIGS. 1-8. Following formation of the lenses 119, a grid layer 160 is positioned on the back face 116 of the reconstituted wafer 114. The grid layer 164 comprises side walls 166 of a selected height.

When the reconstituted wafer 114 is singulated to produce lens modules 165, as shown in FIG. 14, the grid layer 164 is cut so that portions remain surrounding each lens 119 to act as side walls 166. The lens modules 165 are thus configured to be mounted directly over optical emitters and sensors as shown in FIG. 15. The height of the side walls 166 is selected to correspond to the focal length or desired spacing of the intended optical device. Accordingly, in configurations in which the optical sensor plane is not coplanar with a surface on which the lens module 165 is to be mounted, the corresponding height can be selected to compensate for the difference.

The use of semiconductor manufacturing techniques and equipment enables the manufacture of lens modules in large quantities and at high levels of precision, with most of the processes being done by automated machinery, with little or no handling required. The resulting modules are less expensive and more reliable that modules made by known processes.

Molding compounds are substances used in many different packaging processes in the semiconductor industry, such as, e.g., to encapsulate and protect microchips, and to make reconstituted wafers. Molding compounds are typically thermosetting polymeric materials that are composites made from blends of ingredients such as, e.g., resins, fillers, hardeners, catalysts, pigments, and release agents, and are generally provided in a substantially liquid form of a selected viscosity so that they can be injected or poured. Molding compounds are available in a very wide range of formulations from different manufacturers and to meet many different criteria. Accordingly, the term molding compound is to be construed broadly to apply to all such compounds.

The term transparent is used herein to refer to elements that are transparent at least to selected wavelengths of light. The term selectively transparent is used to refer to elements that are transparent to selected wavelengths of light, but that are also opaque or partially opaque to other selected wavelengths. For example, a glass cover might be described as being transparent, even if it is opaque to infrared wavelengths, assuming it is transparent to the wavelengths that are of interest and is not being described for use in an infrared imaging system. However, if the cover is selected specifically for its infrared filtering properties, such as in an application where filtering of those wavelengths is beneficial, then it can also be described as being selectively transparent.

The unit symbol "μm" is used herein to refer to a value in microns. One micron is equal to $1 \times 10^{-6}$ meters.

Ordinal numbers, e.g., first, second, third, etc., are used in the claims according to conventional claim practice, i.e., for the purpose of clearly distinguishing between claimed elements or features thereof. The use of such numbers does not suggest any other relationship, e.g., order of operation or relative position of such elements. Furthermore, ordinal numbers used in the claims have no specific correspondence to those used in the specification to refer to elements of disclosed embodiments on which those claims read, nor to numbers used in unrelated claims to designate similar elements or features.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   positioning a plurality of transparent dice on a carrier substrate;
   forming a reconstituted wafer with the plurality of transparent dice embedded in a molding compound layer, each of the plurality of transparent dice having a first face lying coplanar with a first face of the reconstituted wafer and a second face lying coplanar with a second face of the reconstituted wafer;
   positioning one of a first plurality of lens faces on a first face of each of the plurality of transparent dice;
   positioning one of a second plurality of lens faces on a second face of each of the plurality of transparent dice; and
   cutting the reconstituted wafer into a plurality of lens modules, each having two or more of a plurality of lenses, separated by a portion of the molding compound layer, each of the plurality of lenses including one of the plurality of transparent dice with one of the first plurality of lens faces on the first face of the respective one of the plurality of transparent dice and one of the second plurality of lens faces on the second face of the respective one of the plurality of transparent dice.

2. The method of claim 1 wherein the positioning the plurality of transparent dice comprises positioning the plurality of transparent dice in pairs on the carrier substrate, with a first distance between the pair of dice of each of the respective pairs, and a second distance between adjacent pairs of dice.

3. The method of claim 1, comprising cutting each of the transparent dice from a transparent wafer.

4. The method of claim 3, comprising depositing a selectively transparent coating on a face of the transparent wafer prior to cutting the transparent wafer, each of the transparent dice having a portion of the transparent coating on the first face thereof; and wherein the positioning the plurality of transparent dice comprises positioning each of the plurality of transparent dice with the first face face-down on the carrier substrate.

5. The method of claim 3, comprising:
   depositing a layer of chrome on a face of the transparent wafer prior to cutting the transparent wafer; and
   defining a plurality of openings in the layer of chrome in positions corresponding to positions of respective ones of the plurality of transparent dice.

6. The method of claim 1 wherein the forming the reconstituted wafer comprises:
   depositing molding compound on the carrier substrate over the transparent dice and curing the molding compound to form the reconstituted wafer; and
   planarizing the reconstituted wafer to a thickness that is no more than a thickness of the plurality of transparent dice prior to planarizing the reconstituted wafer.

7. The method of claim 6 wherein the planarizing comprises planarizing the reconstituted wafer to a thickness that is less than the thickness of the plurality of transparent dice.

8. The method of claim 1, comprising positioning a spacer grid on the second face of the reconstituted wafer, the spacer grid configured such that after the cutting the reconstituted wafer, each of the plurality of lens modules includes at least one side wall extending from a perimeter of the respective lens module and a sidewall extending between the two or more of the plurality of dice.

9. The method of claim 1, comprising assembling a plurality of sensors, the assembling including:
   coupling each of the plurality of lens modules to a respective one of a plurality of sensor modules with a first of the two or more of the plurality of lenses positioned adjacent to a light emitter of the respective sensor module and a second of the two or more of the plurality of lenses positioned adjacent to a light receiver of the respective sensor module.

10. A method, comprising:
    forming a reconstituted wafer, including embedding a plurality of transparent glass dice in a layer of molding compound with first surfaces of each of the plurality of dice lying in a common plane with a first surface face of the layer of molding compound, and second surfaces of the plurality of dice lying in a common plane with a second surface of the layer of molding compound;
    positioning a first plurality of plastic lens faces on a first surface of the layer of molding compound, each of the first plurality of plastic lenses being positioned over the first surface of a respective one of the plurality of dice;
    positioning a second plurality of plastic lens faces on a second surface of the layer of molding compound, each of the second plurality of plastic lenses being positioned over the second surface of a respective one of the plurality of dice;
    cutting the reconstituted wafer into a plurality of lens modules, each having a pair of lenses embedded in a portion of the layer of molding compound.

11. The method of claim 10, comprising cutting the plurality of transparent glass dice from a wafer of transparent glass.

12. The method of claim 11, comprising depositing a selectively transparent coating onto the wafer of transparent glass before cutting the plurality of transparent glass dice from the wafer.

13. A device, comprising:
    a plurality of lenses, each lens including a body having a first planar surface lying in a first plane with a first plastic lens face positioned on the first planar surface of the body, a second planar surface lying in a second plane parallel to the first plane, with a second plastic lens face positioned on the second planar surface of the body, side surfaces extending between the first and second planar surfaces; and
    a layer of molding compound material between the plurality of lenses and covering side surfaces of the body, a first surface of the layer of molding compound material lying in the first plane, and a second surface of the layer of molding compound material lying in the second plane.

14. The device of claim 13, comprising a selectively transparent layer between the first surface of the body and the first plastic lens of each of the plurality of lenses.

15. The device of claim 13 wherein at least one of the plurality of lenses includes a layer of chrome on the first planar surface of the body, the layer of chrome having an aperture that is aligned with the first plastic lens.

16. The device of claim 13 wherein a first of the plurality of lenses comprises a selectively transparent layer between the first planar surface of the body and the first plastic lens, and a second of the plurality of lenses does not include a selectively transparent layer between the first surface of the body and the first plastic lens.

* * * * *